(12) United States Patent
Dibirdi et al.

(10) Patent No.: US 9,036,474 B2
(45) Date of Patent: May 19, 2015

(54) COMMUNICATION AVAILABLE TRANSPORT NETWORK BANDWIDTH TO L2 ETHERNET NODES

(75) Inventors: Alp Dibirdi, Andover, MA (US); Hansen Chan, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1100 days.

(21) Appl. No.: 12/795,721

(22) Filed: Jun. 8, 2010

(65) Prior Publication Data

US 2011/0302027 A1 Dec. 8, 2011

(51) Int. Cl.
| *H04L 12/26* | (2006.01) |
| *H04L 12/28* | (2006.01) |
| *G06Q 30/02* | (2012.01) |
| *H04L 12/701* | (2013.01) |
| *H04L 12/803* | (2013.01) |
| *H04L 12/891* | (2013.01) |
| *H04L 12/709* | (2013.01) |
| *H04L 12/729* | (2013.01) |

(52) U.S. Cl.
CPC ........ *G06Q 30/0251* (2013.01); *G06Q 30/0276* (2013.01); *H04L 43/0876* (2013.01); *H04L 45/00* (2013.01); *H04L 47/125* (2013.01); *H04L 45/245* (2013.01); *H04L 45/125* (2013.01); *H04L 47/41* (2013.01)

(58) Field of Classification Search
CPC .............. H04L 12/145; H04L 12/2439; H04L 41/0896; H04L 67/20; H04L 21/24; H04L 47/522; H04L 47/525; H04L 47/783; H04L 2012/5632; H04L 43/0876; H04L 43/0882

USPC .............. 370/229, 230.1, 231, 235, 237, 252; 705/14.72
See application file for complete search history.

(56) References Cited

U.S. PATENT DOCUMENTS

| 6,195,354 B1 | 2/2001 | Skakecki et al. | |
| 6,222,823 B1 * | 4/2001 | Smith et al. | 370/230 |
| 6,381,641 B1 * | 4/2002 | Iwasaki | 709/224 |
| 6,654,374 B1 * | 11/2003 | Fawaz et al. | 370/394 |

(Continued)

FOREIGN PATENT DOCUMENTS

| JP | 2006-287549 A | 10/2006 |
| JP | 2009-118116 A | 5/2009 |

OTHER PUBLICATIONS

Kaplan et al, draft-ietf-isis-ext-eth-01.txt, Extended Ethernet Frame Size Support, 2001, 10 pages.*

(Continued)

*Primary Examiner* — Ahmed Elallam
(74) *Attorney, Agent, or Firm* — Kramer & Amado, P.C.

(57) ABSTRACT

Various embodiments relate to a communications system and related method of advertising available bandwidth capacities of leased links. After leasing a link to an operator device, a provider or operator may monitor the available capacity of the leased link and generate an advertising frame when the actual available capacity is below the defined leased capacity of the link. The advertising frame may be an L2 Ethernet frame in a form similar to the routing protocol used in the communications network to avoid additional strain and complexity in the network due to additional protocols for traffic engineering. After propagating the new information throughout the network using the advertising frame operator devices may redirect or shape their traffic of data in response to the updated available capacity on the leased link.

20 Claims, 6 Drawing Sheets

(56) References Cited

U.S. PATENT DOCUMENTS

| | | | |
|---|---|---|---|
| 6,895,441 B1* | 5/2005 | Shabtay et al. | 709/238 |
| 6,973,033 B1* | 12/2005 | Chiu et al. | 370/230.1 |
| 6,985,436 B1* | 1/2006 | Bhaskar | 370/229 |
| 7,023,871 B2* | 4/2006 | Lind et al. | 370/437 |
| 7,050,441 B2* | 5/2006 | Prakash | 370/395.42 |
| 7,263,069 B2* | 8/2007 | Yegenoglu | 370/254 |
| 7,327,679 B2* | 2/2008 | Naor et al. | 370/232 |
| 7,567,507 B1* | 7/2009 | Bezoza et al. | 370/228 |
| 7,567,512 B1 | 7/2009 | Minei et al. | |
| 7,593,321 B2* | 9/2009 | Galand et al. | 370/218 |
| 7,610,327 B2* | 10/2009 | Kryskow, Jr. | 709/200 |
| 7,889,652 B1* | 2/2011 | Minei et al. | 370/230 |
| 8,385,189 B2* | 2/2013 | Periyalwar et al. | 370/216 |
| 2002/0105949 A1 | 8/2002 | Shinomiya | |
| 2002/0141420 A1* | 10/2002 | Sugiarto | 370/401 |
| 2004/0213255 A1* | 10/2004 | Brinkerhoff et al. | 370/395.1 |
| 2005/0259689 A1* | 11/2005 | Bestavros et al. | 370/477 |
| 2006/0123110 A1* | 6/2006 | Dolganow et al. | 709/225 |
| 2006/0182035 A1* | 8/2006 | Vasseur | 370/238 |
| 2007/0189152 A1* | 8/2007 | Tamura et al. | 370/216 |
| 2007/0280102 A1 | 12/2007 | Vasseur et al. | |
| 2008/0201409 A1* | 8/2008 | Vul et al. | 709/203 |
| 2009/0157443 A1* | 6/2009 | Gracieux | 705/7 |
| 2010/0054123 A1* | 3/2010 | Yong | 370/230 |
| 2010/0058396 A1* | 3/2010 | Russell et al. | 725/60 |
| 2012/0227069 A1* | 9/2012 | Haberman et al. | 725/34 |
| 2012/0259722 A1* | 10/2012 | Mikurak | 705/26.1 |

OTHER PUBLICATIONS

International Search Report for PCT/US2011/038728 dated Jun. 28, 2011.

International Preliminary Report on Patentability in corresponding application No. PCT/US2011/038728 dated Dec. 10, 2012.

Japanese Office Action dated Mar. 4, 2014 issued in Japanese Patent Appl. No. 2013-514219 (with translation).

Martini, L. et al., "Encapsulation Methods for Transport of Ethernet over MPLS Networks", Network Working Group—Request for Comments: 4448, Apr. 2006, 1-22.

Office Action mailed Jan. 9, 2014, in Korean Patent Application No. 2012-7031956 (translation).

First Office Action for Chinese Application No. 201180027876.X dated Sep. 23, 2014.

* cited by examiner

COMMUNICATION AVAILABLE TRANSPORT NETWORK BANDWIDTH TO L2 ETHERNET NODES

TECHNICAL FIELD

Various exemplary embodiments disclosed herein relate generally to telecommunications networks and traffic management.

BACKGROUND

A device, such as a consumer edge device or user equipment like a laptop, mobile phone, or other device connecting to a communications network, may typically lease a certain bandwidth over transport network provider devices. Such a lease may define the duration an allocation of bandwidth to an edge device is valid. For example, a DHCP server may, upon receipt of a valid request, assign a DCHP-configured client an IP address, lease, and IP configuration parameters, such as a subnet mask and default gateway.

For Local Area Networks, the capacity of the bandwidth may usually match the port speed of the device. For example, a consumer device with a connection port speed of 1 Gbps (similar to the operating port speed of an exemplary Gigabit Ethernet (GigE) connection) may end up with 1 Gbps of communication speed. During regular operation, the actual bandwidth capacity, which may be the actual available capacity or "true" or "normal" available capacity, may usually match the leased bandwidth capacity (leased capacity) of the link. However, the bandwidth of the leased link may not necessarily match the port speed of the underlying infrastructure.

For example, a wireless mobile provider may lease 50 Mbps of peer-to-peer lease line over a Metro Ethernet Network (MEN) provider. (i.e. also known as Ethernet virtual line or Ethernet virtual private line) Even though the GigE port connectivity may offer a 1 Gbps capacity, the leased link may only be at 50 Mbps. In this instance, the actual available capacity over the transport provider network may vary, depending on the network load conditions, availability of links and many other factors. For example, when the transport provider network is connected through microwaves, the provider network may be capable of providing a higher bandwidth on a sunny day than during a stormy day. However, the leased bandwidth does not employ any ways to adjust properly due to such fluctuations. Traffic Engineering comes into play to inform edge devices about such changes in capacity, availability, etc.

Other proposed solutions for traffic engineering have generally required an additional protocol to handle messages. For example, Open Shortest Path First-Traffic Engineering (OSPF-TE) is a dynamic routing protocol used in IP networks that requires routing layer peering adjacencies. The protocol exchanges information using opaque link-state advertisement (LSA) carrying type-length-value (TLV) elements. However, because such traffic engineering extensions are added to the network on top of the routing protocols, such proposed solutions generally strain overall network performance and add complexity to the network.

In view of the foregoing, it would be desirable to monitor the actual available capacity of a leased link. In particular, it would be desirable to enable a device in the communications network to determine whether a leased link is operating at an actual available capacity comparable to the leased capacity of an applicable link.

SUMMARY

In light of the present need for effective advertisement of actual available capacity through an Ethernet frame, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a method of transmitting information over a communications network. The method may comprise of determining the available capacity for a first link at a first interface, wherein the first link has a defined leased capacity, creating an advertising frame comprising an Ethernet frame including the available capacity, and transmitting the advertising frame to at least a first device through the first interface.

Various embodiments may also relate to a method of routing information over a communications network. The method may comprise of receiving, at a first device, an advertising frame comprising an Ethernet frame including an available capacity for a first link at a first interface of a provider device, wherein the first link has a defined leased capacity, and rerouting, by the first device, excess or all data to at least one other link, wherein said rerouting compensates for the difference between the leased capacity of the first link and the available capacity of the first link.

Various embodiments may also relate to an apparatus that transmits information over a communications network. The apparatus may comprise a first interface that sends data through a first link, wherein the first link has a defined leased capacity. The apparatus may also comprise a network traffic monitor that determines the available capacity for the first link at the first interface, a frame generator that creates an advertising frame comprising an Ethernet frame including the available capacity, and a network traffic manager that transmits the advertising frame to at least a first device through the first interface.

It should be apparent that, in this manner, various exemplary embodiments enable advertisement of a link's actual available capacity through a network's existing routing protocols. Particularly, by defining a new Ethernet frame type, there may be less stress on the performance of the network and less complexity required to efficiently lease available bandwidth to various devices.

BRIEF DESCRIPTION OF THE DRAWINGS

In order to better understand various exemplary embodiments, reference is made to the accompanying drawings wherein.

DETAILED DESCRIPTION

Referring now to the drawings, in which like numerals refer to like components or steps, there are disclosed broad aspects of various exemplary embodiments.

Figure 1:
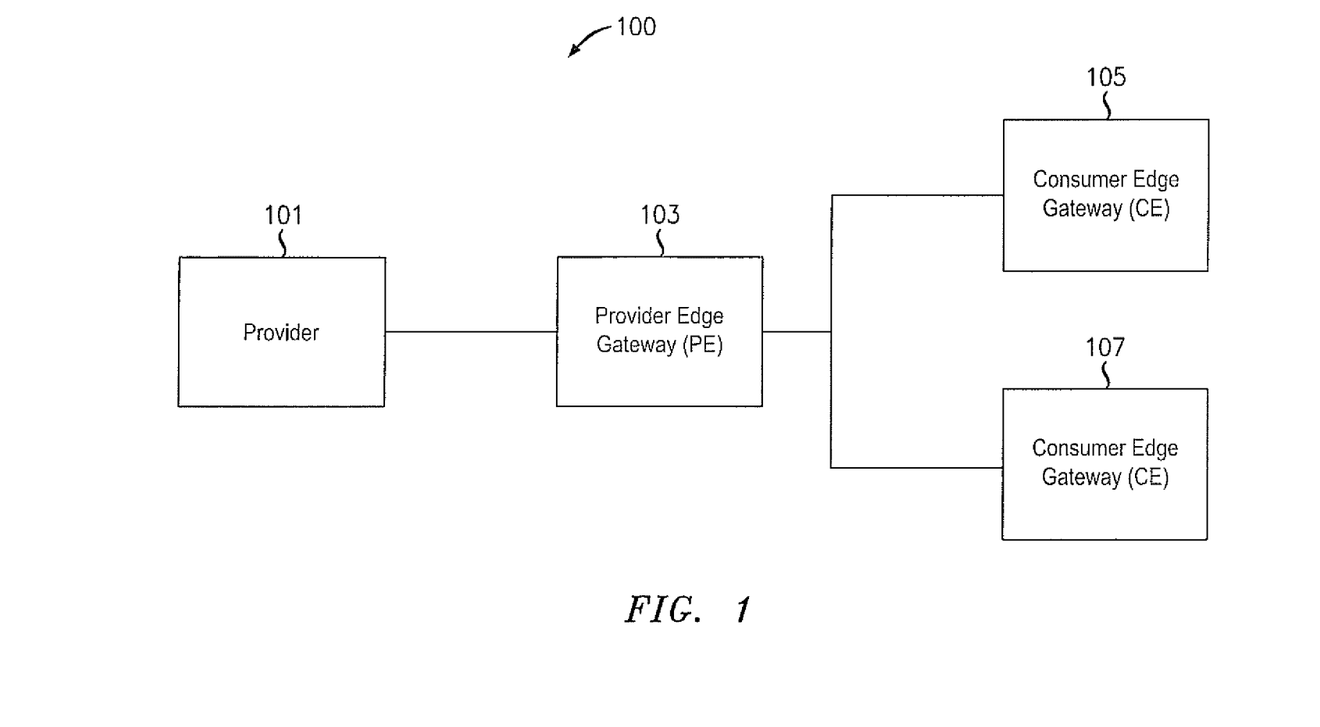
FIG. 1 illustrates an exemplary communications system for delivery of data through a series of links.

FIG. 1 illustrates an exemplary communications system for delivery of data through a series of links. Communications system 100 may include a provider 101, a provider edge gateway (PE) 103, and consumer edge gateways (CEs) 105, 107. In some embodiments, communications system may have a plurality of providers 101 and PEs 103. In some embodiments, a plurality of other devices may connect between the shown devices, such as, for example, provider 101 and PE 103, or PE 103 and CEs 105, 107. In the exemplary embodiment, the links between the devices 101-107 may be Gigabit Ethernet (GigE) communication links. In other embodiments, the links between devices 101-107 may be a plurality of links that are capable of transporting Ethernet frames. As will be discussed below in relation to FIG. 2, there may be a plurality of heterogenous links between devices, such as a GigE communication link and an FE/100 Mbps link between the provider 101 and the PE 103.

Provider 101 may be, for example a MAIL/FTP server that may provide data to CEs 105, 107. In some instance, the provider 101 may provide data upon the request of the CE 105. Provider 101 may consist of a plurality of devices, such as a content server connected to a content database (not shown). In other embodiments, provider 101 may be an edge device to connect CEs 105, 107 to an IP network (not shown). Provider 101 may include, for example, a network traffic monitor and/or network traffic manager and may therefore determine the actual capacity of the link to PE 103 and shape the data rate based on the actual measured rate, as will be discussed below.

Provider Edge Gateway (PE) 103 may be, for example, a provider edge router that may manage the transmission of data from the provider 101 to a plurality of consumer edge gateways 105, 107. In some embodiments, the PE 103 may monitor the bandwidth of both the ingress link from provider 101 and the plurality of egress links to CEs 105, 107. When monitoring any of these links, PE 103 may generate an advertising frame when the actual available capacity of the link is less than the leased capacity of the link. This may involve the PE 103 generating an advertising frame for each respective link. In some embodiments, each respective link may have heterogeneous leased links. For example, PE 103 may lease a link to the provider 101 at 1 Gbps. Accordingly, in this example, PE 103 may then allow CEs 105, 107 to lease links at 500 Mbps, respectively.

As an intermediate device, PE 103 may either monitor the actual available bandwidth, or alternatively, relay an advertising frame generated from another device, e.g., the provider 101. For example, if the link between the provider 101 and the PE 103 is leased at 1 Gbps, but only has an actual available capacity of 500 Gbps, either the provider 101 or the PE 103 may monitor the actual available capacity of the link. As will be discussed in further detail below in relation to FIG. 4, when the provider 101 monitors the capacity of the link, the network traffic monitor in the provider 101 may cause its constituent frame generator to create an advertising frame, which may then be transmitted to the PE 103. PE 103 may then have its network traffic manager adjust its links to compensate for the actual capacity, as relayed in the advertising frame.

For example, the PE 103 may alter the links to CEs 105, 107 to have capacities of 250 Mbps, respectively. PE 103 may then relay the advertising frame generated from the provider 101 that details the actual available capacity. In some embodiments, the network traffic monitor in PE 103 may, upon receipt of the advertising frame from the provider 101, cause the frame generator of PE 103 to generate a second advertising frame, with the relevant bandwidth information based on, but not equivalent to, the bandwidth information included in the advertising frame generated by the provider 101.

In an alternative embodiment, the PE 103 may itself through its network traffic monitor determine that the actual available capacity for any of the links to the provider 101 or the CEs 105, 107 is less than the defined leased capacity. When this occurs, the network traffic monitor may trigger the frame generator in PE 103 to generate an advertising frame. The network traffic manager may then send the advertising frame in both directions, sending an advertising frame towards the provider 101 and at least one additional, identical advertising frame towards at least one CE 105. In some embodiments, the PE 103 may send an identical advertising frame over each link connected to a interface at PE 103. For example, PE 103 may generate and transmit three identical advertising frames to transmit towards the provider 101 and the CEs 105, 107. In other embodiments, PE 103 may generate and transmit different advertising frames depending on the recipient.

Consumer edge gateway (CE) 105, 107 may be, for example, a residential gateway. In some embodiments, CE 105 may be for example, a consumer end device, such as a laptop, mobile device, or other device used directly by a consumer that connects to the communications network. Upon receipt of an advertising frame, the CE 105, 107 may, for example, reshape the rates of data received. For example, CE 105 may, upon receipt of an advertising frame that indicates the actual available capacity is 250 Mbps, police the actual rates so that it expects to receive at a bandwidth of only 250 Mbps.

In some embodiments, CE 105 may reroute expected excess data over other links. For example, if the CE 105 possessed multiple links to either the PE 103 (not shown) or direct links to the provider 101 (not shown), the CE 105 may, upon receipt of the advertising frame, reroute expected excess data through these alternative links so that the CE 105 receives data at the leased bandwidth over multiple links, instead of the single leased link. In alternative embodiments, the provider 101 or the PE 103 may reroute the excess data through alternative links to maintain the leased bandwidth capacity.

Figure 2:
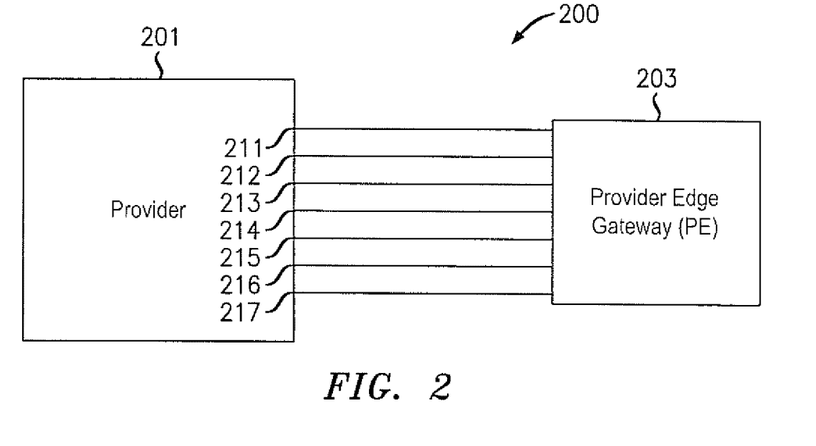
FIG. 2 illustrates an exemplary communications system with a plurality of links between communications devices.

FIG. 2 illustrates an exemplary communications system 200 with a plurality of links between communications devices. As discussed above in relation to communications system 100, the provider 201 in the communications system 200 may connect the provider edge gateway (PE) 203 through at least one link 211. In this embodiment, the provider 201 connects to PE 203 through a plurality of parallel links 211-217. In some embodiments, the links 211-217 share identical properties and may carry equal proportions of the leased link capacity. In alternative embodiments, the links 221-217 may be heterogeneous, with the respective network traffic managers in the provider 201 and the PE 203 setting proportional bandwidths based on the proportional bandwidth capacities of each respective link 211-217.

In some embodiments, the group of links 211-217 may be treated by the provider 201 and the PE 203 as a group link, with an aggregate bulk capacity being measured against the leased capacity. In these embodiments, a lowered actual available capacity on a link, for example, a drop of available capacity on link 214 from 50 Mbps to 25 Mbps, may cause the other links in the group to raise their respective capacities as compensation.

For example, if each of the links 211-217 maintained a leased capacity of 50 Mbps, a drop in link 214 from 50 Mbps to 20 Mbps may cause the remaining six links to make up for the excess data bandwidth of 30 Mbps. Accordingly, in this embodiment, links 211-213, 215-217 may raise their actual available capacity from 50 Mbps to 55 Mbps. In some embodiments, the compensation may be triggered automatically, so that the network traffic managers in either the provider 201 or the PE 203 only see the bulk group link rate. In some embodiments, making the new available bandwidth information on individual links must be communicated between the provider 201 and the PE 203. Both the provider 201 and the PE 203 must have a common understanding of the newly available bandwidth on per link basis. Because the group rate did not change, the respective traffic managers may not trigger the rerouting of excess data to the alternative links. In alternative embodiments, the plurality of links 211-217 may be treated by the network traffic monitor and network traffic managers in the provider 201 and PE 203 as distinct, independent lines. In such instances, the rerouting of the excess data from link 214 to links 211-213, 215-217 may occur as a response to a receipt of a generated advertising frame.

Figure 3:
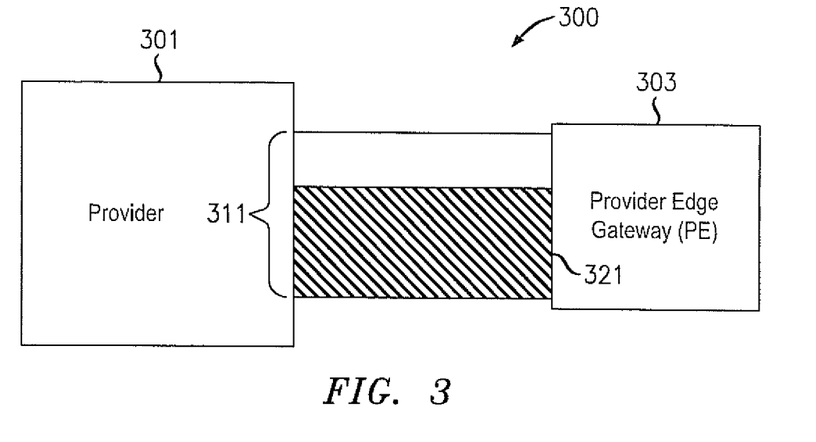
FIG. 3 illustrates an exemplary embodiment of the communications system where the available capacity is less than the leased capacity of a link.

FIG. 3 illustrates an exemplary embodiment of the communications system 300 where the available capacity is less than the leased capacity of a link. The communications system 300 may be similar to the communications systems 100, 200, as discussed above. Provider 301 and provider edge gateway (PE) 303 may be connected through a link 311. PE 303 may lease the link 311 from the provider 301 at a set capacity. In the exemplary embodiment, the PE 303 leases link 311 from the provider 301 at a bandwidth equal to the port speed, for example, 1 Gbps.

However, during the interval that the lease is valid, the actual capacity of the link 311 may not be equal to the capacity leased. This may be due to, for example, fluctuations in overall network capacity due to the nature of the network connections. This is especially true for microwave networks, as changing weather patterns may significantly affect the maximum bandwidth capacity of its constituent links. In some embodiments, high demand for bandwidth may cause the provider 101 to allocate bandwidth to connected devices that exceed the overall capability of the constituent links. In other embodiments, high network load conditions or availability of interfaces at each respective device may also cause a difference between an initial leased bandwidth capacity and the actual available capacity over a link.

In such instances, the link 311 may only deliver an actual available bandwidth capacity 321 that is measurably lower than the capacity of bandwidth leased to the PE 303. When this occurs, it may be crucial to send the actual available bandwidth capacity back to the devices (provider 301 and PE 303), such that each device may take immediate action. Such actions may include shaping and/or policing the rates of the data transfer to match the actual available bandwidth. Other actions may also include rerouting of data partially or in whole (i.e. all data traffic) over alternative links when they exist so as to maintain the leased capacity through a plurality of independent links.

Figure 4:
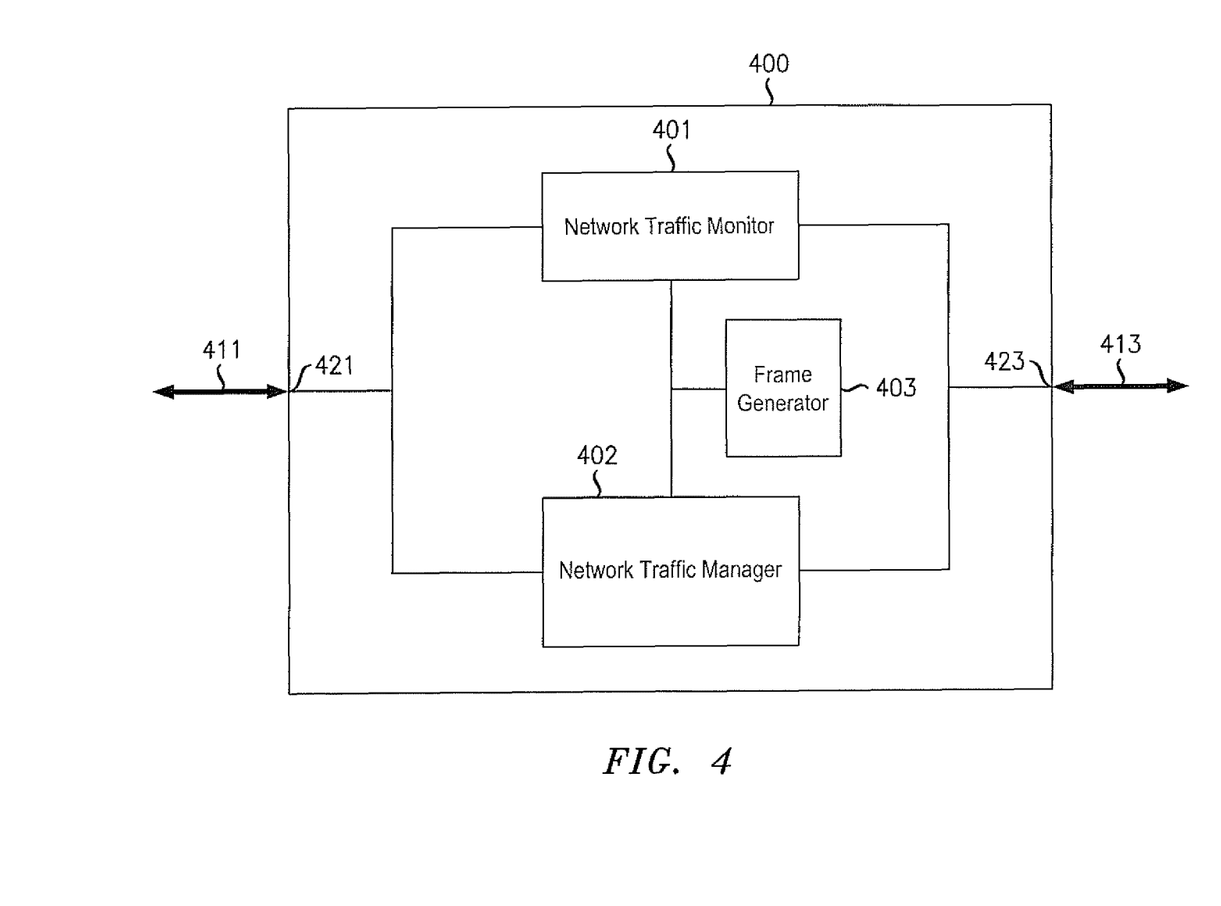
FIG. 4 illustrates an exemplary communications device and its constituent components.

FIG. 4 illustrates an exemplary communications device 400 and its constituent components. Network device 400 may be, for example, the provider 101, PE 103, or CE 105, 107 in the communications system 100 of FIG. 1. In the illustrative embodiment, the network device 400 may be a PE 103 connected to links 411, 413. Network device 400 may include a network traffic monitor (monitor) 401, a network traffic manager (manager) 402, and a frame generator 403. Both the monitor 401 and the manager 402 may be connected to both links 411, 413. In the illustrative embodiment, link 411 may connect at the ingress interface 421 of the network device 400 to, for example, a provider 101, while link 413 may connect at the egress interface 423 of the network device 400 to a CE 105.

Network traffic monitor 401 may be a component internal to the network device 400 that monitors the traffic flow at ingress interface 421 and/or egress interface 423 connected to network device 400. In some embodiments, network device 400 may contain a plurality of ingress interfaces and/or egress interfaces. In such instances, the monitor 401 may track and measure each interface independently. Monitor 401 may record the leased bandwidth capacity for each link 411, 413 and may measure the actual available bandwidth on each link 411, 413. In some embodiments, the monitor 401 may measure the bandwidth of links 411, 413 at defined intervals, for example, every 10 ms. In other embodiments, monitor 401 may be passive, only acting when there is a threshold difference between the leased capacity of a link 413 and the actual capacity in the link 411. For example, monitor 401 may passively measure the link 413 at egress interface 423 until the actual capacity is under a threshold (e.g., a difference of 5 Mbps, typically a user configured threshold). When this difference occurs, the monitor 401 may send a signal to the frame generator 403 to generate an advertising frame.

The signal sent from the monitor 401 to the frame generator 403 may include the actual measured capacity at interface 421, 423. Continuing with this example, when the monitor 401 measures at least a 5 Mbps difference either passively or during an active interval, the monitor 401 may generate a signal to send to the frame generator, with the actual available capacity for an identified link (for example, 35 Mbps at link 413 instead of the leased capacity of 50 Mbps) included in the payload of the generated signal.

Network traffic manager 402 may be a component in the network device 400 that manages the transfer of data through interfaces 421, 423. Manager 402 may direct the flow of data, for example, from ingress interface 421 to egress interface 423. Manager 402 may also relay data packets, such as L2 Ethernet frames, according to information included in the packet. For example, when network device 400 is a PE, the manager 402 may relay a received data packet to a destination CE according to, for example, the destination Media Access Control (MAC) address included in the data packet's header.

Manager 402 may receive an advertising frame generated from frame generator 403 and direct the packet to at least one of the interfaces 421, 423. In some embodiments, the manager 402 may add the destination address of the advertising frame. Accordingly, in such instances, the manager 402 may also multicast the advertising frame. When multicasting the advertising frame, the manager 402, or in some embodiments, all routers within the subnet (i.e. 224.0.0.2), may use any other multicast destination address where the least-significant bit of the first octet is set to "1". This may indicate that the Ethernet frame is to be flooded to all points in the subnet or network. In some embodiments, use of standard Ethernet broadcast packet may also be desirable. Manager 402 may therefore send an advertising frame both over its ingress and/or egress interfaces. Manager 402 may either relay the advertising frame from the frame generator 403 when the monitor 401 in the same device measures a difference in the actual available bandwidth capacity, or may relay an advertising frame received from another device, such as an advertising frame received at ingress interface 421 over link 411 from the provider 101.

Frame generator 403 may be a component in the network device 400 that generates an advertising frame, which includes information about the actual available capacity of a given link. Frame generator 403, may produce, for example, an L2 Ethernet frame, as will be discussed in further detail below, in response to a signal received from the monitor 401. In some embodiments, the frame generator 403 may include the actual available capacity in the payload of the message. In some embodiments, the frame generator 403 may add the address information in the advertising frame instead of the manager 402.

In some embodiments, the internal components 401-403 of the network device 400 may be combined into a larger component. For example, a network device may have a chip or other hardware that includes a frame generator 403 and network traffic manager. A person of skill would be knowledgeable of existing combinations of internal components of a network device 400.

Figure 5:
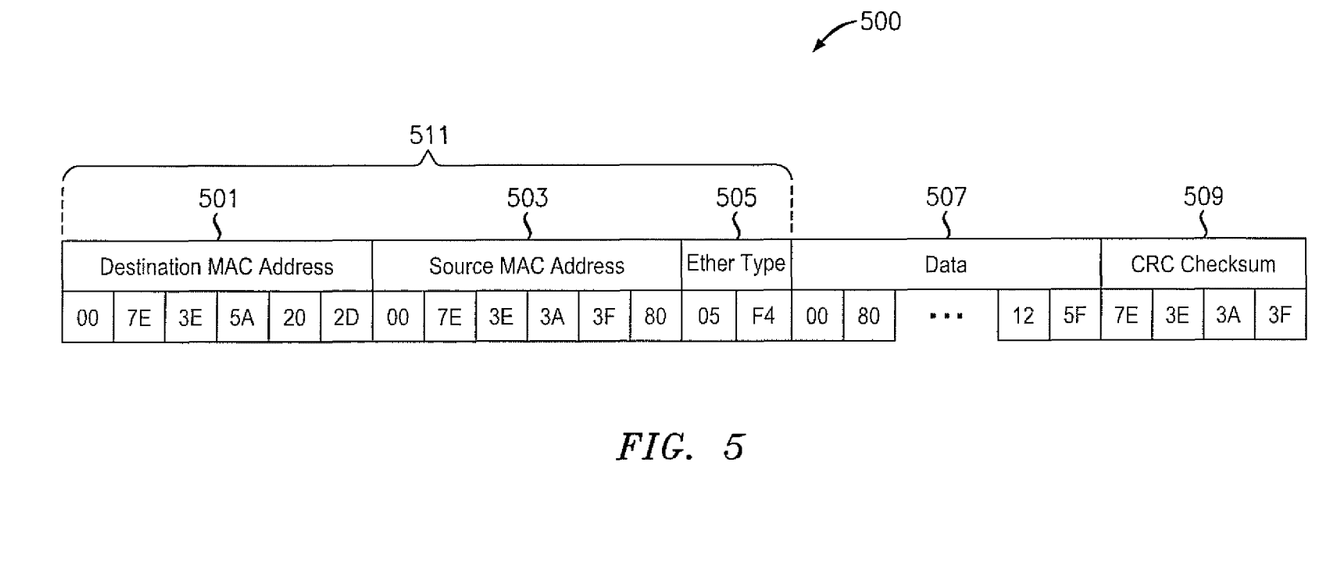
FIG. 5 illustrates an exemplary advertising frame as an L2 Ethernet frame.

FIG. 5 illustrates an exemplary advertising frame as an L2 Ethernet frame. Advertising frame 500 may be an L2 Ethernet (i.e., DIX) frame used for signaling at the physical layer of the OSI networking model (following, for example, IEEE 802.3). In some embodiments, the advertising frame is transferred on the data link layer. Advertising frame 500 may therefore have a MAC Header 511 consisting of destination MAC address 501, Source MAC Address 503, and Ether Type 505. Advertising frame 500 may also have a data payload 507 and a CRC Checksum 509.

The length of the advertising frame 500 may vary, with its various components being at least two octets in length. For example, the destination and source MAC addresses 501, 503 are six octets in length, while the CRC checksum is four octets and the Ether Type is two octets, respectively. Data payload 507 may vary in length, ranging from a minimum of 46 to a maximum of 1500 octets. Exemplary advertising frame 500 illustrates an example L2 Ethernet frame, with each octet represent by its hex equivalent (i.e., $7E_{hex}=01111110_2$).

MAC Header 511 may contain the destination MAC address 501, source MAC address 503, and Ether Type 505. Frame generator 403 may add the Ether Type 505 to the advertising frame, while either the frame generator 403 or the network traffic manager 402 may add the destination and source MAC addresses 501, 503. In the illustrative embodiment, the advertising frame 500 may be multicast by the manager 402, as the last octet of destination MAC address of $2D_{hex}=00101101$ has a least-significant bit of "1," indicating that the advertising frame is to be multicast and propagated throughout the communications network.

Ether Type 505 may indicate that the L2 Ethernet frame 500 is an advertising frame. Frame generator 403 may indicate a particular frame is an advertising frame 500 by specifying an undefined Ether Type. For example, the communications network 100 may assign the undefined Ether Type code "$1524_{10}$" to indicate an advertising frame. When the frame generator 403 subsequently adds the $05_{hex} F4_{hex}$ octets as the Ether Type 505, the manager 402 may determine that the Ethernet frame it is handling is in fact an advertising frame. The communications network 100 may specify any undefined Ether Type, such as values in the range of 1523-1535, or non-allocated values above 1535. In this context, undefined Ether Type can include undefined values between 1500 and 1536 (exclusive) and unspecified values above 1535 (exclusive). Such unspecified values may be values not already allocated to an organization in the IEEE List of Ether Type values. Use of Ethernet frame for bandwidth advertisement may allow the co-existence of other protocols including routing protocols. Ethernet-layer bandwidth advertisement may typically not add extra strain to communication nodes, unlike routing protocols that support traffic engineering information. Such devices that support traffic engineering also have coupled with its operation the burden of running a routing protocol, handling keepalive packets, and re-calculating topology based on changes within the network; etc. all add extra burden on communication device's processor.

Data payload 507 may vary in length and may contain information regarding the actual available capacity of a target link and may also contain relevant rerouting information. Data payload 507 may contain one or more TLVs (type-length-value) that may contain information regarding, for example, the single bulk-sum aggregate link capacity when the target link is in fact a plurality of links grouped together.

An advertisement frame may also contain a dot1p, which may be a Virtual Local Area Network (VLAN) header priority bit. The dot1p may designate the required treatment for a particular Ethernet heading for a particular priority. For example, the dot1p may indicate a specific VLAN or link used for a particular set of data. This may occur when the excess data includes different data types (e.g., voice packets, video packets, and text packets). The dot1p header may therefore differentiate between different component links in a link group, which may enable a network traffic manager to reroute excess data with more specificity. For example, an advertising frame including specific actual capacities of individual links of link group 211-217 in FIG. 2 may enable the relevant manager to reroute data from a deficient link 214 to other links 211-213, 215-217 capable of handling the excess data.

Figure 6:
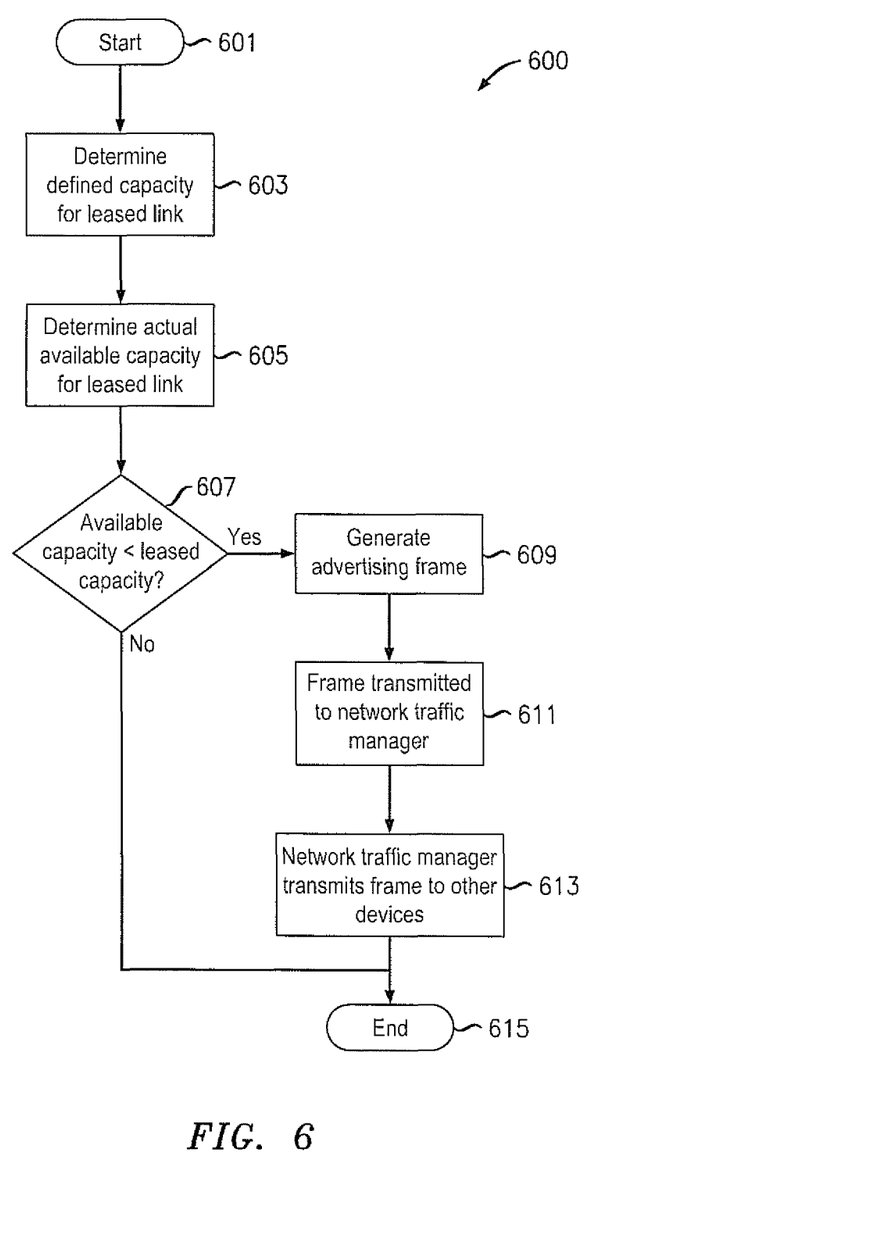
FIG. 6 illustrates an exemplary flowchart for transmitting an advertising frame.

FIG. 6 illustrates an exemplary flowchart for transmitting an advertising frame. Method 600 may be performed by, for example, a provider 101 or PE 103 to determine whether a link leased by another device has a lower actual capacity. Method 600 begins at step 601 and proceeds to step 603, where the device determines the defined capacity for the leased link. This may involve leasing a defined bandwidth to another device, for example a provider 101 leasing 500 Mbps to a PE 103 or a PE 103 leasing 50 Mbps to a CE 105. In some embodiments, this may involve the provider 101 or PE 103 determining the terms of an existing leased capacity by, for example, checking a stored value in the network traffic monitor 401. The value determined may be termed the defined leased capacity.

In step 605, the device may determine the actual available capacity for the leased link. This may include, for example, probing the bandwidth data from interface/port object. This may involve, for example, the network traffic monitor 401 in the device measuring the actual capacity at a given time. This determining step 605 may occur at pre-determined intervals (e.g., every 10 ms), or may occur passively, where the monitor 401 taking no action until step 607.

In step 607, the monitor 401 may determine whether the measured, actual available capacity of the link is less than the defined leased capacity. In some embodiments, this may be true only when the available capacity drops below a defined value of the leased capacity, such as 5 Mbps below the defined leased capacity. Such a threshold may help avoid unnecessary traffic adjustments due to slight variations from the defined leased capacity. The threshold value may be set by a network engineer, or may be set by the provider 101 or PE 103 upon the set up of the lease. If the actual available capacity is equal to or above the defined leased capacity, the method 600 may end at step 615. Otherwise, when the actual available capacity is below the defined leased capacity, method 600 may proceed to step 609.

In step 609, an advertising frame may be generated. This may include the monitor 401 sending a signal including the actual available capacity to the frame generator 403, with the frame generator 403 producing an advertising frame in the form of an L2 Ethernet frame including the actual available capacity information in its payload. The advertising frame may also include a value in its Ether Type 505 that is undefined in the standard, but used in communications system 100 to indicate that the produced frame is an advertising frame. The frame may also include various TLVs indicating specific information about one or more related links in a group. Once the advertising frame is generated, method 600 may move to step 611.

In step 611, the frame generator may send the advertising frame to the network traffic manager 403. Method 600 may then move to step 613, where the network traffic manager 403 may send the advertising frame to one or more devices. The devices receiving the advertising frame may also process the information included in the advertising frame and relay the information to other devices. In some embodiments, the traffic manager in 613 may add a destination MAC address to the advertising frame if it was not added by the frame generator 403 in step 611. In some embodiments, the network traffic manager 403 may send the advertising frame through multicast, which may propagate the advertising frame throughout the communications system. Once the network traffic manager transmits the advertising frame, method 600 may end at step 615.

Figure 7:
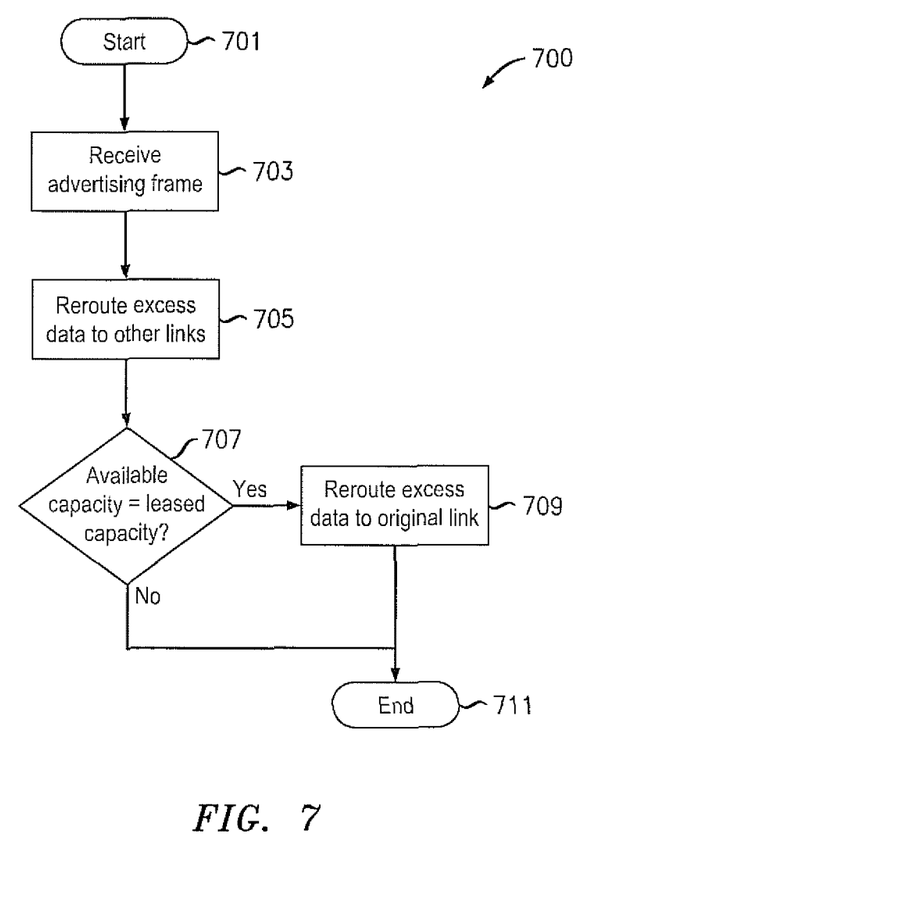
FIG. 7 illustrates an exemplary flowchart for rerouting excess data upon receipt of an advertising frame.

FIG. 7 illustrates an exemplary method 700 for rerouting excess data upon receipt of an advertising frame. Method 700 may be performed by an Operator device, such as a PE 103 or CE 105, 107 that leases a link from a provider device, such as provider 101 or PE 103. Method 700 may be performed in order to compensate for the newly-updated loss in leased capacity by rerouting excess data through alternative links. Similarly, the operator device may also use other methods to shape and/or police the traffic in response to the reduction of actual available capacity.

Method 700 begins at step 701 and proceeds to step 703, where the network traffic manager 403 of the operator device receives an advertising frame. The advertising frame may be received from another device, such as a provider 101 or PE 103. In some embodiments, the network traffic manager 403 may receive the advertising frame from the frame generator 403. In either embodiment, the advertising frame may include information about a target link that has an actual available capacity below that of the defined leased capacity.

Method 700 may therefore proceed to step 705, where the network traffic manager of the Operator device may respond to the information included in the advertising frame by rerouting the excess data to other links. The other links may be capable of increasing their actual available bandwidth to compensate for the difference between the defined leased capacity and the actual available capacity of the target link.

For example, PE 203 may be connected to the provider 201 through a series of 1 Gbps links 211-217 leased at 500 Mbps each. The network traffic manager of PE 203 may in step 703 receive an advertising frame indicating that the actual available capacity of the link 214 is only 200 Mbps. The network traffic manager may therefore in step 705 reroute excess data to links 211-213, 215-217, increasing the actual available capacity of each respective link beyond the leased capacity of 500 Mbps to 550 Mbps.

In step 707, the network traffic monitor of the Operator device may determine whether, after the rerouting of excess data, the actual available bandwidth of the target link has returned to its defined leased capacity. Step 707 may occur at a defined interval after step 705 (e.g., 10 min). In some embodiments, the network traffic manager may determine that the two quantities are "equal" when the actual available bandwidth is within the defined threshold. If the network traffic monitor determines that the quantities are "equal," method 700 may proceed to step 709, where the network traffic manager reroutes the excess data back to the original target link and end at step 711. When the actual available capacity remains below the defined leased capacity at step 707, method 700 may then proceed directly step 711 and the process.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A method of transmitting information over a communications network, the method comprising:
    determining an available capacity for a first link at a first interface, wherein the first link has a first defined leased capacity;
    creating a first advertising frame comprising an Ethernet frame of an undefined Ether type including the available capacity;
    transmitting the first advertising frame to at least a first device through the first interface; and
    rerouting, by the first device, at least excess data to at least one other link, wherein the rerouting compensates for a difference between the first defined leased capacity of the first link and the available capacity of the first link.

2. The method of claim 1, wherein the creating step occurs when the available capacity of the first link is below the first defined leased capacity of the first link.

3. The method of claim 1, further comprising:
selecting the undefined Ether type from one of a number of values that are undefined for a standard Ether Type field.

4. The method of claim 3, wherein the first advertising frame further comprises:
at least one type-length-value (TLV) in a payload that includes link capacity information.

5. The method of claim 1, further comprising:
transmitting, by the first device through at least one secondary link, the first advertising frame to at least one secondary device.

6. The method of claim 1, further comprising:
leasing, from a second device, a second defined leased capacity of bandwidth over a second link.

7. The method of claim 6, further comprising:
transmitting the first advertising frame to at least the second device through a second interface.

8. The method of claim 7, further comprising:
transmitting, by the second device through at least one secondary link, the first advertising frame to at least one secondary device.

9. The method of claim 1, further comprising:
determining when the available capacity for the first link at the first interface is equal to the first defined leased capacity;
creating a second advertising frame comprising an L2 Ethernet frame including an updated available capacity;
transmitting the second advertising frame to at least the first device through the first interface; and
rerouting at least the excess data to the first link at the first interface.

10. An apparatus that transmits information over a communications network, the apparatus comprising:
a first interface that sends data through a first link, wherein the first link has a first defined leased capacity;
a network traffic monitor that determines an available capacity for the first link at the first interface;
a frame generator that creates a first advertising frame comprising an Ethernet frame of an undefined Ether type including the available capacity; and
a network traffic manager that transmits the first advertising frame to at least a first device through the first interface, wherein the network traffic manager reroutes excess data to at least one other link, and the rerouting compensates for a difference between the first defined leased capacity of the first link and the available capacity of the first link.

11. The apparatus of claim 10, wherein the frame generator creates the first advertising frame when the available capacity of the first link is below the first defined leased capacity of the first link.

12. The apparatus of claim 10, wherein the first advertising frame comprises an L2 Ethernet frame.

13. The apparatus of claim 12, wherein the first advertising frame further comprises:
at least one type-length-value (TLV) in a payload that includes link capacity information.

14. The apparatus of claim 10, wherein the first device transmits the first advertising frame through at least one secondary link to at least one secondary device.

15. The apparatus of claim 10, further comprising:
a second interface that receives data through a second link, wherein the second link has a second defined leased capacity.

16. The apparatus of claim 15, wherein the network traffic manager transmits the first advertising frame to at least a second device through the second interface.

17. The apparatus of claim 15, wherein the second device transmits the first advertising frame to at least one secondary device through at least one secondary link.

18. The apparatus of claim 10, wherein the network traffic monitor determines when the available capacity for the first link at the first interface is equal to the first defined leased capacity, the frame generator creates a second advertising frame comprising an L2 Ethernet frame including an updated available capacity, and the network traffic manager transmits the second advertising frame to at least the first device through the first interface and reroutes the excess data to the first link at the first interface.

19. A method of routing information over a communications network, the method comprising:
receiving, at a first device, a first advertising frame comprising an Ethernet frame of an undefined Ether type including an available capacity for a first link at a first interface of a provider device, wherein the first link has a defined leased capacity; and
rerouting, by the first device, at least excess data to at least one other link, wherein said rerouting compensates for a difference between the defined leased capacity of the first link and the available capacity of the first link.

20. The method of claim 19, further comprising:
determining, by the provider device, when the available capacity for the first link at the first interface is equal to the defined leased capacity;
creating, by the provider device, a second advertising frame comprising an Ethernet frame including an updated available capacity;
transmitting, by the provider device, the second advertising frame to at least the first device through the first interface; and
rerouting, by the first device, the excess data to the first link at the first interface.

* * * * *